United States Patent [19]

Stannard et al.

[11] Patent Number: 5,440,554
[45] Date of Patent: Aug. 8, 1995

[54] BROADBAND PRIVATE AUTOMATIC BRANCH EXCHANGE

[75] Inventors: Richard Stannard, Stuttgart; Hartmut Dunger, Hemmingen; Volker Werbus, Stuttgart, all of Germany

[73] Assignee: Alcatel N.V., Amsterdam, Netherlands

[21] Appl. No.: 648,487

[22] Filed: Jan. 31, 1991

[30] Foreign Application Priority Data

Feb. 1, 1990 [DE] Germany .................. 40 02 862.3

[51] Int. Cl.⁶ ............................................ H04L 12/64
[52] U.S. Cl. .................................. 370/60.1; 370/68.1
[58] Field of Search .................... 370/60, 60.1, 94.1, 370/94.2, 62, 68.1; 379/67, 88, 89, 48, 347

[56] References Cited

U.S. PATENT DOCUMENTS

| | | | |
|---|---|---|---|
| 3,997,736 | 12/1976 | Gorman, II | 379/90 |
| 4,796,254 | 1/1989 | van Baardwijk et al. | 370/60 |
| 4,876,681 | 10/1989 | Hagiwara et al. | 370/60 |
| 5,097,466 | 3/1992 | Kammerl | 370/60 |
| 5,115,426 | 5/1992 | Spanke | 370/60 |

FOREIGN PATENT DOCUMENTS 0239908  3/1987  European Pat. Off. .

OTHER PUBLICATIONS

P. Pernsteiner et al, "Video– und Datenkommunikation im VBN", *NTZ Nachrichtentechnische Zeitschrift*, vol. 42 No. 8, 1989, pp. 486–493.

*Primary Examiner*—Wellington Chin
*Attorney, Agent, or Firm*—Robbins, Berliner & Carson

[57] ABSTRACT

A broadband private automatic branch exchange is to be implemented in which all broadband user stations can be switched like normal telephone terminals with all features of a conventional telephone private automatic branch exchange and without each broadband terminal requiring its own operator position. To achieve this, in accordance with the invention, all the broadband terminals (BB-E1, BB-E24) which are connectable via a broadband switching array (BB-V) to the subscriber line unit (TAE) of the public broadband network (VBN) are also connected like ordinary telephone user stations to a narrow band telephone private automatic branch exchange system (SB-PABX) which is connected via a signaling conversion module (VBNA) to the line unit (TAE) and which initiates the narrow band call setup and controls the broadband switching array for switching broadband calls.

7 Claims, 1 Drawing Sheet

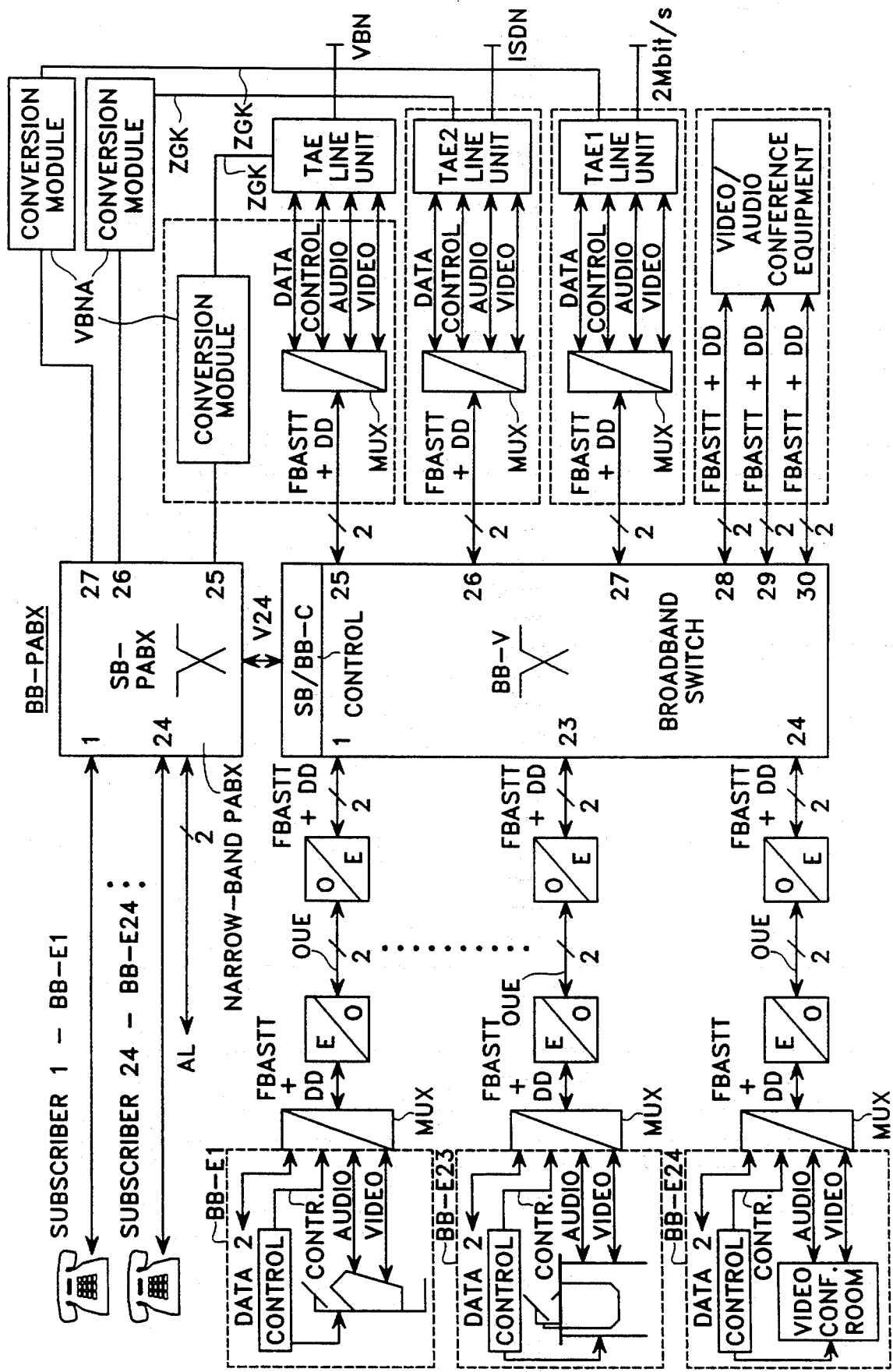

BROADBAND PRIVATE AUTOMATIC BRANCH EXCHANGE

TECHNICAL FIELD

The invention is based on a broadband private automatic branch exchange for switching video, audio, and data messages,

CLAIM FOR PRIORITY

This application is based on and claims priority from an application first filed in Germany under Application No. 40 02 862.3. To the extent such prior application may contain any additional information that might be of any assistance in the use and understanding of the invention claimed herein, it is hereby incorporated by reference.

BACKGROUND ART

The public broadband switching network VBN of the German Bundespost permits transmission of image and audio in television quality, at a bit rate of 140 mbit/s. The VBN represents a direct dial broadband network for a large number of subscribers with broadband terminals, such as video telephones and video conferencing equipment. Each subscriber is coupled to the VBN via a subscriber line unit TAE which converts the 140 mbit/s signals into video, audio, and data signals. A broadband private automatic branch exchange may also be connected to the VBN via such a subscriber line unit. This prior art broadband private automatic branch exchange consists of a video switching array, an audio switching array, and a central controller. Up to 15 user stations may access video communication on the VBN via this exchange. For this, each broadband terminal includes its own video telephone controller and a separate operator position for controlling call setup and for signaling in the VBN (P. Pernsteiner, F. Brendel, NTZ, Vol. 42 (1989), No. 8, pp. 486–493).

Through the separate operator position associated with each broadband terminal, one subscriber line unit TAE is available for use by 15 user stations; however, functions characteristic of a private automatic branch exchange, i.e., arbitrary internal and external calls, are not possible for any of them.

DISCLOSURE OF INVENTION

The object of the invention is to provide a broadband private automatic branch exchange wherein all its terminals can be switched without each, having its own associated separate operator positions.

This problem is solved according to the invention through the technical teaching of the principal claim.

Switched by a broadband switching array are connected to a conventional narrow band telephone private automatic branch exchange like "normal" narrow band telephone user stations and since, in addition, a signaling conversion module performs a bidirectional signaling conversion-broadband network VBN and telephone private automatic branch exchange-on the conventional signaling required for the telephone private automatic branch exchange, all the thus connected broadband terminals can be switched, without each broadband terminal requiring its own dedicated operator position. Thus, it is also possible advantageously to make all features of the telephone private automatic branch exchange available to the broadband terminals.

All broadband terminals can thus set up and release calls autonomously.

Also particularly advantageous is the use according to the invention of a digital speech memory in the signaling conversion module since all necessary signals are converted into voice and thus become intelligible to the user. By utilizing spoken messages to guide the user, a cost-effective telephone private automatic branch exchange can control the setup and release of calls without any needed modifications for signaling conversion.

Additionally, in an advantageous embodiment of the invention, signal adaptation to various public networks, such as via a subscriber line unit for networks with a bit rate of 2 mbit/s or for an integrated services digital network (ISDN), can be achieved by means of appropriate reprogramming of the signaling conversion module.

Additional advantageous forms of the subject matter of the invention are presented in the secondary claims.

BRIEF DESCRIPTION OF DRAWINGS

The drawing depicts a block diagram of a broadband private automatic branch exchange according to the invention.

BEST MODE FOR CARRYING OUT THE INVENTION

A private automatic branch exchange (BB-PABX) according to the invention consists of a broadband switching array BB-V, which is essentially a multi-dimensional spatial matrix with 32 input/outputs for the broadband signals (video, audio, data) to be switched. The broadband switching network includes decoders for addressing the crosspoints, memories for storing the setup or release data, and a serial interface (V24) for control data.

Such a broadband switching array BB-V, as used in the exemplary embodiment, may be obtained from the company SVT Video Systems, Ltd., Essex, England under the designation AVS 264 Video Matrix. Twenty-four broadband terminals BB-E1 through BB-E24 are, as shown in the FIGURE, connected to the input/outputs 1 through 24 of the broadband switching array BB-V, each via an optical transmission line OUE into which the appropriate electro/optical E/O and optical/electric converters O/E are incorporated.

The analog signal switched via the broadband switching array BB-V consists of a video signal with two audio channels FBASTT and of two data channels DD and is converted for further processing in each terminal BB-E1, . . . , BB-E24 via corresponding multiplexers/demultiplexers MUX.

The broadband terminals can be, for example, video telephones, multifunction video workstations, or even a video conference room BB-E24. To produce video conferencing connections, a video conference set is connected via multiplexers/demultiplexers MUX to the input/outputs 28 through 30 of the broadband switching array BB-V, in the same manner as the broadband terminals.

An additional input/output 25 of the broadband switching array BB-V is coupled via an appropriate multiplexer/demultiplexer MUX with a subscriber line unit TAE for a public broadband Switching network VBN of the German Bundespost to permit external broadband connections.

Optionally, a first additional input/output 27 of the broadband switching array BB-V is coupled via an appropriate multiplexer/demultiplexer MUX with a first additional subscriber line unit TAE1 for networks with a bit rate of 2 mbit/s (video conferences, e.g., via satellite), and a second additional input/output 26 of the broadband switching array BB-V is connected via an appropriate multiplexer/demultiplexer MUX with a second additional subscriber line unit TAE2 for an integrated services digital network—ISDN.

Furthermore, a narrow band telephone private automatic branch exchange SB-PABX is coupled to the broadband switching array BB-V via the V24 serial interface and a narrow band/broadband connection computer SB/BB-C, to control the set-up and release of broadband connections. The 24 broadband terminals are likewise connected to the telephone private automatic branch exchange, more specifically, to the input/outputs 1 through 24. For this, the broadband terminals are coupled like narrow band telephone user stations via conventional 2-wire interfaces with the telephone private automatic branch exchange and can be switched by it like conventional telephones.

In accordance with the invention, a narrow band/broadband signaling conversion module VBNA is also connected on one side like a narrow band telephone user station at an additional input/output 25 of the telephone private automatic branch exchange SB-PABX and on the other side via a signaling channel ZGK to the subscriber line unit TAE for the broadband switching network VBN.

Optionally, input/outputs 26 and 27 of the telephone private automatic branch exchange are connected for signaling conversion via additional signaling conversion modules with the first additional subscriber line unit TAE1 or with the second additional subscriber line unit TAE2.

Additional telephone user stations (not shown) may be connected to the telephone private automatic branch exchange SB-PABX which can be connected to the public telephone network by analog as well as digital means (ISDN) via trunk lines AL. However, only the user stations equipped with broadband terminals are authorized to set up calls via the broadband network VBN.

To be able to set up an internal or external broadband call, a narrow band connection must always be established via the telephone private automatic branch exchange SB-PABX. For this purpose, the signaling conversion module VBNA has a computer unit consisting of a microprocessor (e.g., from Intel's MCS 51 family) with the associated program memory and working memory (e.g., EPROM and RAM) and a signal transmitter/receiver, preferably a multifrequency code transmitter/receiver, as well as a digital speech memory. The signaling channel ZGK is also coupled via an HDLC interface (high level data link) with the signaling conversion module.

The signaling conversion module VBNA converts a preestablished control signal for the broadband network VBN in compliance with FTZ guideline 141R50 into a corresponding preestablished multifrequency code selection signaling signal for the telephone private automatic branch exchange, and at the same time (as will be explained further below), in the specific case of a control signal coming from the subscriber line unit TAE, by superimposing audible messages, spoken guidance may be provided to the user.

Starting from a quiescent (nonswitched) state of the broadband private automatic branch exchange BB-PABX, the case of an outgoing call via the broadband switching network VBN to a remote subscriber will now be described.

To that end, a narrow band connection is first set up within the telephone private automatic branch exchange SB-PABX from a first user station A, e.g. broadband terminal BB-E1, to the signaling conversion module VBNA, wherein the signaling conversion module has the status of an additional telephone user station of the telephone private automatic branch exchange. Under the control of the microprocessor, a spoken "dial tone" announcement is now read out from the speech memory and transmitted to user station A for signaling the system's readiness to accept dialing information.

Simultaneously, the multifrequency code transmitter/receiver is switched to the "receive" mode to accept the dialing information transmitted by user station A via the narrow band voice channel, i.e., to detect multifrequency tone pairs. The tone pairs received are converted and sent via the signaling channel ZGK to the subscriber line unit TAE to set up a call with the thus-selected remote subscriber.

When the completion of a connection via the broadband network VBN is verified by means of the corresponding signaling channel, a temporary narrow band telephone connection is established with the user station A.

In addition, a connection of user station A to the subscriber line unit TAE is set up via the narrow band/broadband connection computer SB/BB-C via the broadband switching array BB-V so that, if both subscribers agree to a broadband connection, it is activated by corresponding keys on the broadband terminal BB-E1. This results in a video, audio, and data connection via the broadband network.

If one of the subscribers releases, the corresponding release signal is transmitted either via the telephone private automatic branch exchange and the conversion module to the broadband network VBN, or conversely via the subscriber line unit TAE and the conversion module to the telephone private automatic branch exchange; whereupon the connection is released not only in the narrow band but also, under the control of the connection computer SB/BB-C, in the broad band.

For the case of an incoming call, i.e. remote subscriber A requests user station B of the broadband private automatic branch exchange BB-PABX via the VBN, the incoming call request is transmitted via the signal code channel ZGK and logged in the conversion module VBNA. Then, an appropriate conversion occurs in which, under the control of the computer unit, the multifrequency code transmitter/receiver is set to the "transmit" mode, and the multifrequency tone pairs corresponding to the selection information are transmitted. The telephone private automatic branch exchange SB-PABX makes the requested connection, so that user station B may be called.

When the subscriber B responds, the narrow band telephone connection is again first established, and if a broadband connection is desired, connection of a broadband call occurs immediately thereafter in the same manner as with the outgoing call. Release of the connection also occurs in the same manner.

In addition to multifrequency tone signaling, various announcements may be made to provide spoken user guidance at the broadband terminal user station. To that end, for example, announcements such as "ringing tone" "reserved connection" "error/malfunction" or "wrong number" may be read from the speech memory and used to modulate the signal to the user station.

Thus, the broadband terminal user station is provided with clearly intelligible information simply and cost effectively, without requiring modifications in the telephone private automatic branch exchange. This means a considerable simplification of the use of a public broadband network connection, without each subscriber having to have its own operator position.

Furthermore, all features of the telephone private automatic branch exchange SB-PABX (e.g., conference, callback) are available to the broadband user stations of the broadband private automatic branch exchange BB-PABX according to the invention, since these features are simple to incorporate via the narrow band connection, and the broadband connection then merely has to be activated as previously described.

The broadband private automatic branch exchange according to the invention is in no way restricted to the particular signaling scheme described in the above exemplary embodiment since this can be converted to any type of signaling by simple programming of the signaling conversion module, for example, to be able to use the optional connections to the ISDN or to the 2 mbit/s network.

We claim:

1. Broadband private automatic branch exchange comprising
    a broadband switching array for switching video, audio, and data messages,
    a plurality of broadband terminals each connected to a respective one of a plurality of input/output terminals of the broadband switching array,
    a subscriber line unit for a public switched broadband network, said line unit being connected to an additional input/output terminal of the broadband switching array,
    a telephone private automatic branch exchange having said plurality of broadband terminals each also connected to a corresponding input/output terminal of the telephone private automatic branch exchange like a conventional narrow band telephone user station,
    a narrow band/broadband signaling conversion module connected to the subscriber line unit and, like a conventional narrow band telephone user station, to an additional input/out terminal of the telephone private automatic branch exchange, and
    a narrow band/broadband connection computer connected to the broadband switching array and the telephone private automatic branch exchange for setting up and releasing broadband connections.

2. A broadband private automatic branch exchange according to claim 1, wherein the narrow band/broadband signaling conversion module further comprises,
    a computer unit,
    a signal transmitter/receiver,
    first means for converting a signal specified for the broadband network and transmitted from the line unit via a signaling channel to the signaling conversion module into a corresponding signal specified for the telephone private automatic branch exchange, and
    second means for converting a signal coming from the telephone private automatic branch exchange into a signal specified for the broadband network.

3. A broadband private automatic branch exchange according to claim 2, wherein the signaling conversion module further comprises
    a digital speech memory in which announcements related to the signals specified in the broadband network are stored, and
    said announcements, under control of the computer unit, are transmitted via the telephone private automatic branch exchange to the broadband terminals to provide vocal guidance to the user.

4. A broadband private automatic branch exchange according to claim 3, wherein the signaling conversion module is connected to the signaling channel via an HDLC interface coupled to the computer unit.

5. A broadband private automatic branch exchange according to claim 2, wherein
    the signaling conversion module is connected to a first additional line unit for a broadband network with a bit rate of 2 bits/s, and
    said first additional line unit is connected to a first additional input/output of the broadband switching array.

6. A broadband private automatic branch exchange according to claim 2, wherein,
    the signaling conversion module is connected to a second additional line unit for an integrated services digital network, and
    said second additional line unit is connected to a second additional input/output of the broadband switching array.

7. A broadband private automatic branch exchange according to claim 2, wherein the signal transmitter/receiver in the signaling conversion module is a multi-frequency code transmitter/receiver.

* * * * *